Figure 1:
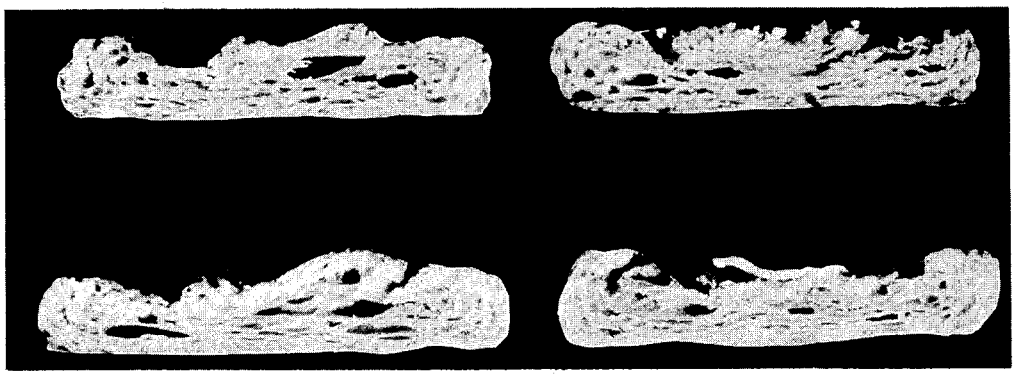
Figure 2:

United States Patent

[11] 3,615,682

[72] Inventors Glenn D. La Baw
Greenwich, Conn.;
David P. Kidger, Glen Rock; Fred Vanderveer, Mahwah, N.J.
[21] Appl. No. 666,566
[22] Filed Sept. 7, 1967
[45] Patented Oct. 26, 1971
[73] Assignee National Biscuit Company

[54] PASTRY MIX AND MARGARINE THEREFOR
9 Claims, 6 Drawing Figs.
[52] U.S. Cl. .................................................. 99/92, 99/122, 99/123
[51] Int. Cl. ...................................................... A23d 3/00, A21d 13/08
[50] Field of Search .......................................... 99/92, 94, 118, 122, 123; 260/409

[56] References Cited
UNITED STATES PATENTS

| | | | |
|---|---|---|---|
| 2,136,653 | 11/1938 | Moore et al. .................. | 99/118 |
| 2,164,291 | 6/1939 | Jenness ......................... | 260/409 |
| 3,255,016 | 6/1966 | Parker .......................... | 99/118 X |

Primary Examiner—Joseph M. Golian
Attorney—I. A. Strombeck

ABSTRACT: A superior margarine for laminated doughs capable of entrapping up to 25 percent by volume of air, is prepared from 80–86 percent of partially hydrogenated soybean oil, 0.0–1 percent of an emulsifier, 12–16 percent water, and 0–4 percent salt. Coloring agents, flavoring agents and milk solids are optional. The soybean oil is hydrogenated to an iodine value of 65–70, under conditions to give Solid Fat Indices 43–47 at 10° C, 28–32 at 21.1° C, 23–27 at 26.7° C, 10.5–14.5 at 33.3° C, 1.5–4.5 at 37.8° C. and 2 maximum at 40° C.

INVENTORS
GLENN D. LA BAW
DAVID P. KIDGER
BY FRED VANDERVEER

AGENT

PASTRY MIX AND MARGARINE THEREFOR

This invention relates to oils and fats and more particularly to an improved margarine composition which is very advantageous in certain varieties of baking goods requiring a laminated dough, such as Danish pastry, French pastry, puff pastry, and flaked dinner rolls.

The "laminated dough" as used herein, designates a dough consisting of many thin alternate layers of dough and fat, which, upon baking, give a separation of strata and an open network of crisp and flaky layers. These doughs are commonly made from shortenings prepared from animal or vegetable fats and oils, including hydrogenated oils and their mixtures. Most of these conventional shortenings include milk solids in the proportion of 11–20%.

Many improvements in the composition and in the process of preparation of margarines and shortenings have been claimed. U.S. Pat. No. 3,250,628 claims the treatment of the milk which is incorporated into the margarine, with a proteolytic enzyme. The object is to produce a clotting of the proteins of the milk phase, and the information of the colloidal suspension, which prevents further curdling of the proteinaceous material. Other patents cover the use of water instead of milk. For instance U.S. Pat. No. 1,944,962 describes the use of water in conjunction with malt wort. Recently U.S. Pat. No. 3,278,568 describes and claims a process for the preparation of a partially hydrogenated soybean oil, which is still contains a substantial proportion of linoleic acid, that is, the 18-carbon acid, with two double bonds in the chain. The keeping qualities and nutritional valve of this product are claimed to be due to the selective hydrogenation conditions, which give a product still containing a high proportion of linoleic acid.

In spite of the great number of shortenings available on the market, several difficulties still exist. The conventional compositions are capable of entrapping only a small amount of air, and the finished laminated doughs are not sufficiently porous nor flaky. Another disadvantage is that the conventional shortenings liquify during baking, before the structure has become firm, and do not blend with the other ingredients. The finished goods are not tender and are unsatisfactory in texture characteristics.

Still another disadvantage of the conventional margarines and shortenings is that the preparation of goods involving a laminated dough is time-consuming and must be conducted by experienced workers because of the several steps of spreading the fat onto the dough, folding the dough, rolling and refrigerating, which must be conducted in a specified sequence. Manifestly the baking industry has been in need of a margarine capable of entrapping a substantial volume of air, in order to obtain tasty, flaky and tender products, with the minimum expenditure of time and labor.

Some improvement has been achieved by the process of U.S. Pat. No. 3,255,016 which utilizes fat compositions of melting point at least 110° F., with Solid Fat Indices in the range of 23–43 at 10° C., 18–34 at 21.1° C., 17–33 at 26.6° C., 15–28 at 33.3° C., 12–24 at 37.7° C., and 6–17 at 43.3° C. The dry mixes prepared with these shortenings are claimed to be advantageous in the preparation of Danish pastry and French pastry and similar goods, because they do not require the step of spreading the fat onto the rolled sheet of dough and permit a substantial saving of time and labor. To our knowledge, however, the finished goods prepared with the shortening of this patent are not tender and the texture is not sufficiently flaky and porous.

An object of this invention is to provide a novel shortening which is capable of entrapping a substantial amount of air, in the range of 25%, upon whipping and which provides laminated doughs of improved porosity and tenderness. Another object is to provide laminated doughs with a shortening which does not leave a greasy taste in the mouth.

The crux of this invention resides in the finding that a very satisfactory shortening is obtained by the use of partially hydrogenated soybean oil of iodine value 65–70 with 12–16 percent water, with 0.0–1 percent of an emulsifier, and about 0–4 percent salt. coloring agents, flavoring agents and milk solids are optional. Within the scope of the invention, the partially hydrogenated soybean oil has Solid Fat Indices in the range of 43–47 at 10° C, 28–32 at 26.7° C., 10.5–14.5 at 33.3° C., 1.5–4.5 at 37.8° C. and 2 maximum at 40° C.

In order to obtain a partially hydrogenated soybean oil of the Solid Fat Indices set forth above, it is essential that the hydrogenation be conducted under specific conditions. A satisfactory procedure consists of hydrogenating at 30 pounds of hydrogen, at a temperature of 200° C. and within nickel on kieselguhr as a catalyst, until the iodine value is in the range between 65–70. More specifically, it has been found that, when soybean oil is partially hydrogenated under different experimental conditions and with a different catalyst, the product may have an iodine value 65–70, but differs substantially in the Solid Fat Indices. Although the invention is not to be limited by speculative and theoretical explanations, it is believed that the advantageous properties of the margarine prepared as described herein are due to the specific conditions used in the hydrogenation, which give a product with the specified iodine value and Solid Fat Indices.

Soybean oil, before hydrogenation, consists of of 45–60 percent of linoleic acid, and that is, 9, 12-octadecadienoic acid, 2–13 percent linolenic acid, which is 9,12, 15-octadecatrienoic acid, and about 11 percent palmitic acid. After hydrogenation as described herein, the oleic acid content is between 72 percent and 78 percent usually 75 percent, while the linoleic acid and linolenic acid are present at the most, in traces. A small proportion of the 18-carbon acids with two and three double bonds, linoleic and linolenic acids, are completely hydrogenated to stearic acid, and the proportion of the latter increases on hydrogenation, from 4 to 10 percent to 15 percent. The major part of the linoleic acid and linolenic acid, however, under experimental condition of hydrogenation as described herein, is selectively hydrogenated to oleic acid, that is the 18-carbon acid, with only one double bond. It is significant that, when soybean oil is partially hydrogenated under experimental conditions different from the process set forth above, the product may have an iodine value in the desired range 65–70, but the Solid Fat Indices are substantially different and the margarines prepared from these samples of partially hydrogenated soybean oil, give laminated doughs of inferior qualities. The Solid Fat Indices referred to herein are determined by the A.O.C.S. tentative method Cd 10–57 (corrected 1961).

Another feature of this invention is the incorporation into the shortening of an emulsifier, in the amount of 0–1 percent, which comprises at least 90 percent of a monoglyceride such as the monoglycerides from a fully hydrogenated fat. For instances, the monoglycerides of fully hydrogenated lard, cottonseed, soybean, peanut, tallow, may be satisfactorily used. The monoglyceride of tallow has been used here with excellent results. Other emulsifiers within the scope of the invention are sorbitan monooleate, sorbitan monolaurate, and monoesters from ethylene oxide-polypropylene glycol condensation products.

The preferred portion of ingredients for the margarine, within the scope of the invention, are 82–86 percent of the partially hydrogenated soybean oil, 12–15 percent of water, 0.5percent of the monoglyceride from fully hydrogenated tallow, 2 percent of salt, coloring and flavoring agents in amount of 0.2–0.4 percent. Lecithin, in amount of 0.25 percent is also added.

The preparation of the margarine of this invention is conducted by conventional methods, as described, for instance, in Bailey, "Industrial Oils and fats," Interscience Publishers, Inc., New York 3rd Ed., pp. 347–349. The hydrogenated fat is melted, mixed with the emulsifier, lecithin, and the coloring agent. Then water with salt dissolved in it, is added, the emulsion cooled, and allowed to crystallize. On an industrial scale, the apparatus used is a heat exchanger, which permits rapid heating and cooling. Efficient mixing is carried out to insure that the margarine has the capability of entrapping 25 percent volume of air when the margarine is whipped for use in baking compositions.

This invention includes the process of preparing a margarine capable of entrapping up to 25 percent by volume of air upon whipping, which comprises the steps of:

1. hydrogenating soybean oil until the iodine value is 65 to 70 and the Solid Fat Indices are 43 to 47 at 10° C., 28 to 32 at 21.1° C., 23 to 27 to 26.7° C., 10.5 to 14.5 at 33.3° C., 1.5 to 4.5 at 37.8° C., 2 maximum at 40° C., 2. blending 80 to 86 parts of the fat from step 1 with 0.1 to one part of an emulsifier consisting of 90% of a monoglyceride emulsifier;

3. mixing said product from step 2 with an aqueous phase comprising 12 to 16 parts of water and zero to four parts of salt to form an emulsion;

4. continuously passing said emulsion through a chilling zone to provide a supercooled slurry in which crystallization is initiated;

5. and transferring said slurry to a hold-up zone for completion of crystallization under quiescent conditions. The invention will now be described in detail by reference to the accompanying drawings of which FIG. 1 represents Danish pastry manufactured with the margarines of this invention, and FIGS. 2 through 6 represent Danish pastry manufactured with conventional samples of shortenings and margarines.

For the preparation of the laminated doughs of the Danish pastry, a conventional formulation of basic ingredients and a conventional method of manufacture are applied for each of the samples, the only difference being in the shortening or margarine used. Three pounds of sugar, 2 pounds of margarine, 1 pound of milk powder and 4 ounces of salt are mixed for 3–5 minutes. Then 8 pounds of water, 2 pounds of liquid whole eggs and 1 pound and 8 ounces of yeast are added and the mixture is mixed 2 minutes at low speed. To the blend then are added 13 pounds of bread flour and 4 pounds of cake flour under mechanical mixing. The material is removed from the mixer at a temperature of 65° F. and sheeted out to a thickness of about 0.75 inch. The margarine prepared according to this invention, at a temperature of 65° F., in the amount of 8 pounds, is layered over two-thirds of the dough, then the one-third portion of dough, not covered with margarine, is folded over the center portion, and finally the end portion is folded over it. The dough is rolled out to a thickness of about 0.75 inch, and the folding operation is repeated three times, allowing the dough to rest 10 minutes between the folding operation. After the last operation, the dough is allowed to rest for a period of 20 minutes to one-half hour and finally cut into portions of the desired size and shape.

The pictures show the superiority of the margarine in accordance with this invention over the conventional margarines and shortenings. The finished product of FIG. 1 is more porous, more flaky, and superior in tenderness and texture characteristics.

Figure 3:
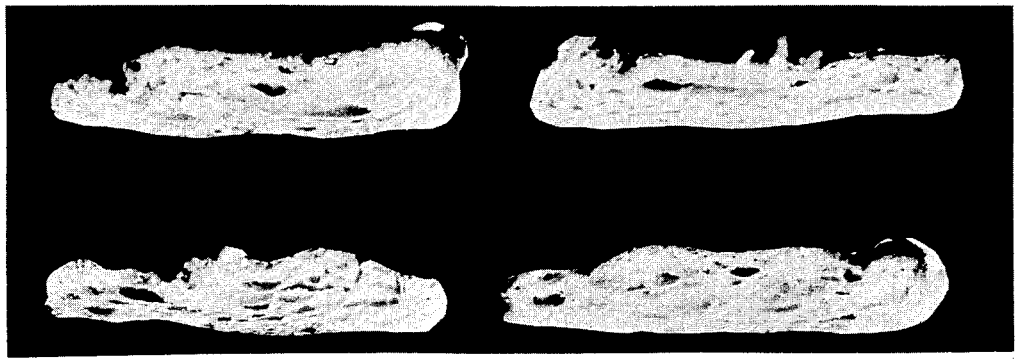
Figure 4:
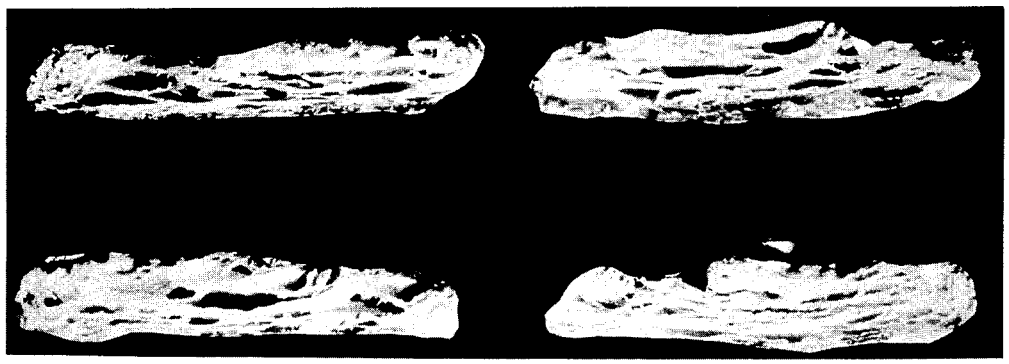
Figure 5:
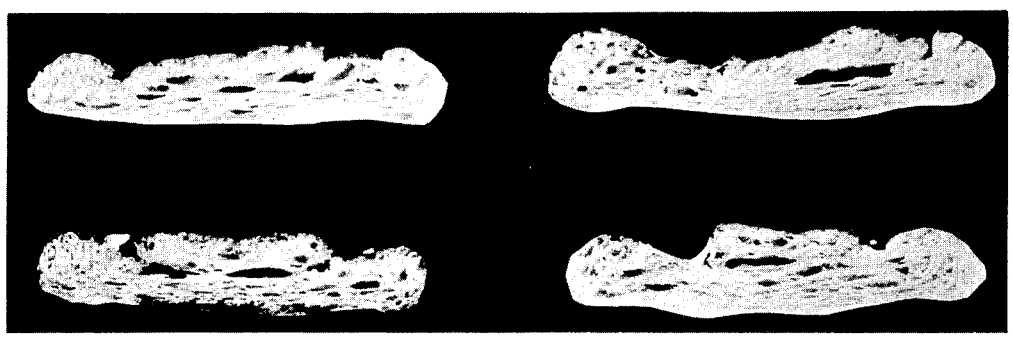
Figure 6:
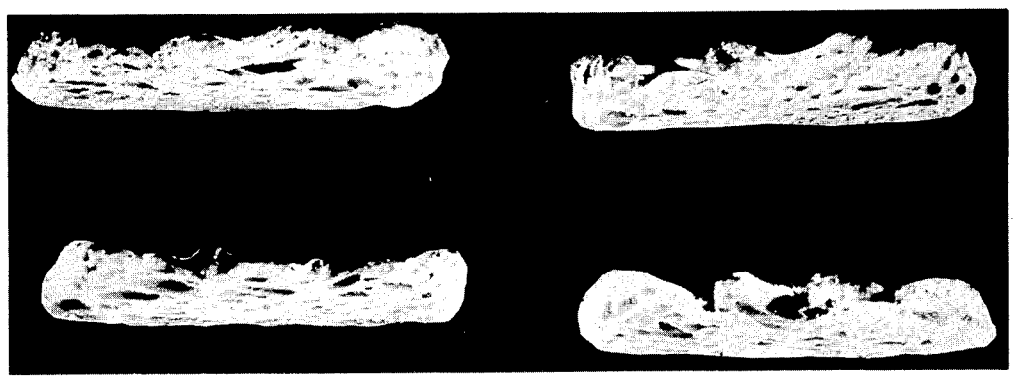

Table I below sets forth the melting point, iodine value, water content, milk solids, sodium chloride, and the specific gravity of the conventional shortenings used in the manufacture of the pastry of Nos. 2–6. The margarine of this invention, used to prepare the pastry of FIG. 1, is designated by No. 1. The shortenings of Nos. 2, 4, 5 and 6 consist of partially hydrogenated soybean oil, while the shortening used in the manufacture of Danish pastry of FIG. 3 is a mixture of partially hydrogenated soybean oil and partially hydrogenated tallow, in about equal proportions.

TABLE I

[Properties of shortenings used in Dough No. 1, the margarine of this application, and shortenings used in Doughs Nos. 2–6]

| Sample No. | 1 | 2 | 3 | 4 | 5 | 6 |
|---|---|---|---|---|---|---|
| M.P., ° F. | 105.8 | 107.6 | 122 | 108.2 | 108 | 104 |
| Iodine value | 68.7 | 72.2 | 62.8 | 74.8 | 76.7 | 75.6 |
| Water content, in percent | 13.5 | 0.0 | 11.4 | 20.5 | 21.4 | 18.9 |
| Milk solids, in percent | 0.0 | 0.1 | 0.1 | 1.4 | 1.2 | 1.9 |
| Sodium chloride, in percent | 1.0 | 0.0 | 1.4 | 2.5 | 2.0 | 2.8 |
| Specific gravity | 0.896 | 0.895 | 0.918 | 0.896 | 0.896 | 0.896 |

The above data show that the iodine value and the specific gravity of all the shortenings, are fairly close, with the exception of the shortening No. 3.

Table II below shows the Solid Fat Indices of Samples 1 through 6.

TABLE II

[Solid fat indices of shortenings and margarines 1–6]

| Temp. in ° C. | Samples Nos. | | | | | |
|---|---|---|---|---|---|---|
| | 1 | 2 | 3 | 4 | 5 | 6 |
| 10 | 45.7 | 35.3 | 29.4 | 28.4 | 35.5 | 29.3 |
| 21.1 | 32.3 | 26.9 | 25.5 | 18.9 | 29.1 | 20.0 |
| 26.7 | 26.9 | 24.2 | 25.2 | 17.2 | 26.9 | 18.3 |
| 33.3 | 10.4 | 13.2 | 22.5 | 9.1 | 15.4 | 11.5 |
| 37.8 | 4.4 | 8.2 | 19.3 | 6.5 | 9.3 | 8.2 |
| 40 | 1.5 | 5.2 | 17.7 | 4.5 | 5.6 | 6.9 |

The date of Table I and Table II demonstrate that the several samples of partially hydrogenated soybean oil 2, 4, 5 and 6 have an iodine value fairly close to Sample 1, but that the Solid Fat Indices at different temperatures differ substantially.

Table III sets forth the percentage composition of the different fats of the margarines and shortenings used in Sample 1–6 determined by gas chromatography.

TABLE III

[Compositions of shortenings and margarines in Samples 1–6]

| | Samples Nos. | | | | | |
|---|---|---|---|---|---|---|
| | 1 | 2 | 3 | 4 | 5 | 6 |
| $C_{12}$ | | T | T | T | | |
| $C_{14}$ | | T | T | 2.4 | | |
| $C_{14}$ (two double bonds) | | | | T | | |
| $C_{16}$ (palmitic acid) | 11.5 | 14.7 | 21.8 | 12.7 | 15.6 | 13.7 |
| $C_{16}$ (one double bond) | | | 1.3 | | | |
| $C_{17}$ | | T | T | | | |
| $C_{18}$ (saturated stearic acid) | 12.9 | 13.1 | 22.8 | 9.7 | 13.2 | 12.4 |
| $C_{18}$ (oleic acid) | 75.6 | 60.2 | 32.3 | 65.0 | 57.4 | 62.2 |
| $C_{18}$ (linoleic acid) | T | 12.0 | 16.2 | 12.7 | 13.8 | 11.7 |
| $C_{18}$ (linolenic acid) | | | 3.2 | | | |

The data above demonstrate that in Sample No. 1, the oleic acid content is the highest, while linoleic acid and linolenic acid are practically absent. The stearic acid content may vary between 12 percent and 13 percent, and the palmitic 12 content ranges between 11 percent and 12 percent.

The superior texture characteristics of the pastry manufactured with the margaine of this invention, Sample No. 1, is evidenced by its low specific gravity, as compared with other samples of pastry, 2–6. The values of the specific gravity are shown in table IV below.

TABLE IV

Specific Gravity of Samples 1–6

| | Weight | Vol. (cc.) | Specific Gravity |
|---|---|---|---|
| 1 | 280 | 950 | 0.294 |
| 2 | 265 | 790 | 0.335 |
| 3 | 291 | 780 | 0.373 |
| 4 | 283 | 710 | 0.398 |
| 5 | 263 | 880 | 0.298 |
| 6 | 318 | 900 | 0.353 |

The specific gravity of the finished goods of the laminated doughs made with the margarine of this invention varies, in different preparations, between 0.285 and 0.300.

It is manifest that, by this invention, a margarine is provided which permits the preparation of laminated doughs with superior texture, and with a very open network of crisp and flaky layers. The dough prepared with the margarine described herein, requires less time and labor and gives excellent products even in the hands of inexperienced workers. The air entrapped by the margarine of this invention, facilitates the sheeting, rolling and folding steps, which are essential in the preparation of laminated doughs. The fact that water is used in the margarine, in accordance with this invention, in total or essentially total replacement of milk, provides for superior texture characteristics and prevents the "weeping effect," that is the separation of the aqueous from the fatty phase, during baking. The margarine prepared as described herein is suitable for the preparation of all varieties of goods involving laminated doughs, for instance dinner rolls, Danish, French and puff pastry.

What is claimed is:

1. An improved margarine capable of entrapping air in a quantity of up to 25 percent by volume of air upon whipping, which comprises an homogenized emulsion of 80 to 86 of partially hydrogenated soybean oil, of Solid Fat Indices 43 to 47 at 10° C., 28 to 32 at 21.1° C., 23 to 27 at 26.7° C., 10.5 to 14.5 at 33.3° C., 1.5 to 4.5 at 37.8° c., 2 maximum at 40° C.,12 16 percent water, 0 to 1 percent of an emulsifier and 0% to 4 percent salt.

2. The margarine according to claim 1 additionally comprising coloring and flavoring agents.

3. The margarine according to claim 2 additionally comprising 0.1 percent to 0.5 percent milk solids.

4. The margarine according to claim 2 wherein said emulsifier comprises 0.0% to 0.5% of lecithin.

5. The margarine according to claim 1 wherein the emulsifier comprises at least 90 percent of a monoglyceride which is a member selected from the group consisting of the monoglycerides from fully hydrogenated lard, tallow, cottonseed, soybean and peanut.

6. The margarine of claim 1 wherein said partially hydrogenated soybean oil has been hydrogenated at hydrogen pressure of about 30 pounds per square inch, at a temperature of about 200° C., and using a nickel-on-kieselguhr catalysts, until an iodine value between 65 and 70 was reached.

7. The margarine according to claim 1 wherein 12 to 15 percent of water is used and wherein 82 to 86 percent of a partially hydrogenated soybean oil is used, which comprises between 72 and 78 of the glycerides of oleic acid and between 10 percent and 15 percent of the glycerides of stearic acid and between 11 percent and 12 percent of the glycerides of palmitic acid.

8. The margarine according to claim 7 wherein the amount of said partially hydrogenated soybean oil is 84 percent and 85% and of the water is 13 to 14 percent and which also contains 0.5 percent monoglyceride emulsifier, 0.25 percent lecithin and 2 percent salt.

9. A pastry mix for laminated doughs comprising in combination with the conventional dough flour, sugar, salt and milk solids, a margarine capable of entrapping air in a quantity of up to 25 percent by volume of air upon whipping, which comprises 12 to 16 percent of water, 80 to 86 percent of a partially hydrogenated soybean oil of iodine value 65 to 70, and solid Fat Indices 43 to 47 at 10° C., 28 to 32 at 21.1° C., 23 to 27 at 26.7° C., 10.5 to 14.5 at 33.3° C., 1.5 to 4.5 at 37.8° C., 2 maximum at 40° C., wherein the glycerides from oleic acid are present in an amount between 72 percent and 78 percent wherein the stearic acid glycerides are in the amount between 10 percent and 15 percent, and wherein the palmitic acid glycerides are present in an amount between 11 percent and 12 percent

* * * * *